United States Patent [19]

Crawford et al.

[11] 4,079,017

[45] Mar. 14, 1978

[54] PARALLEL STEAM REFORMERS TO PROVIDE LOW ENERGY PROCESS

[75] Inventors: Duffer Brooks Crawford; Colman Lee Becker; Joseph Ray LeBlanc, all of Houston, Tex.

[73] Assignee: Pullman Incorporated, Chicago, Ill.

[21] Appl. No.: 743,426

[22] Filed: Nov. 19, 1976

[51] Int. Cl.$^2$ ............................ C01B 1/18; C01B 2/16
[52] U.S. Cl. ................................ 252/373; 48/214 A; 48/196 R; 23/288 R
[58] Field of Search ........................................ 252/373

[56] References Cited

U.S. PATENT DOCUMENTS

| | | | |
|---|---|---|---|
| 2,579,843 | 12/1951 | Mader | 252/373 |
| 3,094,391 | 6/1963 | Mader | 48/196 A X |
| 3,264,066 | 8/1966 | Quartulli et al. | 252/373 X |
| 3,446,594 | 5/1969 | Buswell et al. | 252/373 X |
| 3,549,335 | 12/1970 | Grotz | 23/288 R |
| 3,598,527 | 8/1971 | Quartulli et al. | 252/373 X |
| 3,743,488 | 7/1973 | Bogart | 252/373 |
| 3,771,261 | 11/1973 | Mandelik et al. | 252/373 X |
| 3,958,951 | 5/1976 | Woebcke et al. | 252/373 |

FOREIGN PATENT DOCUMENTS

| | | | |
|---|---|---|---|
| 1,159,826 | 7/1969 | United Kingdom | 252/376 |

*Primary Examiner*—Howard T. Mars
*Attorney, Agent, or Firm*—Kurt S. Myers; Clarence W. Crady

[57] ABSTRACT

A low energy process for the production of hydrogen-rich gas which involves the process sequence of primary reforming and secondary reforming includes parallel steam reformers for the primary reforming of the hydrocarbon feed, one portion of the hydrocarbon feed being heated using radiant heat, i.e., a steam reforming furnace, and another portion of the hydrocarbon feed being heated using indirect heat exchange with the effluent from the secondary reforming, i.e., an exchanger-reactor.

10 Claims, 2 Drawing Figures

PARALLEL STEAM REFORMERS TO PROVIDE LOW ENERGY PROCESS

BACKGROUND OF THE INVENTION

1. Field of the Invention

The present invention is directed to an improved process and system for the production of hydrogen-rich gas by the steam reforming of hydrocarbons. More specifically, the present invention involves a low energy process and system for the production of ammonia synthesis gas including the process steps of primary and secondary reforming for producing hydrogen-rich gas which includes the parallel primary reforming of the hydrocarbon feed, one portion of the hydrocarbon feed being heated using radiant heating and another portion being heated using indirect heat exchange with the effluent from the secondary reforming.

2. Prior Art

U.S. Pat. No. 3,094,391 discloses a steam reforming furnace having a reaction radiant-heating section and a reaction convection-heating section. A portion of the hydrocarbons is passed to tubes in the radiant-heating section of a furnace, and the balance of the hydrocarbons is passed in parallel to tubes provided in the reaction convection-heating section for steam reforming.

A conventional steam reforming furnace is disclosed in U.S. Pat. No. 3,257,172 and in a conventional process, as disclosed in U.S. Pat. No. 3,441,393, the steam reforming furnace is the sole system for carrying out the steam reforming reaction.

U.S. Pat. No. 3,549,335 discloses a reactor wherein the hydrocarbons are steam reformed in the lower portion of an inner shell having a container for secondary catalyst thereabove and a process for primary and secondary reforming in the same reactor is carried out.

U.S. Pat. No. 3,751,228 discloses an apparatus for reforming hydrocarbons under pressure comprising a heat-exchange chamber incorporating reaction tubes for effecting a process of primary reforming and a shaft chamber for effecting a process of secondary reforming located at the open ends of the reaction tubes.

U.S. Pat. No. 3,958,951 discloses a reformer furnace having a convection section, means for preventing radiant heat from the burners to the convection section, a centrally disposed effluent tube suspended from the top of the furnace, a tube sheet surrounding and suspended from the centrally disposed effluent tube and reformer tubes suspended from the tube sheet which reformer tubes are in communication with the interior of the effluent tube.

U.S. Pat. No. 3,870,476 discloses a pressure vessel for catalytic endothermic reactions in the upper portion of which is a supporting plate for a plurality of open ended shell tubes within which are reaction tubes.

SUMMARY OF THE INVENTION

In a process and system for the production of a hydrogen-rich gas from hydrocarbons which comprises the sequence of primary reforming followed by secondary reforming, the improvement which comprises in parallel heating to primary reforming conditions a first mixture of the hydrocarbons and steam by radiant heating and heating to primary reforming conditions a second mixture of the hydrocarbons and steam by indirect heat exchange with the effluent from the secondary reforming process and reforming in the presence of a steam reforming catalyst, then combining the primary reformed effluents and introducing the combined effluents to the secondary reforming process to form a hydrogen-rich gas.

DESCRIPTION OF THE PREFERRED EMBODIMENTS

Figure 1:
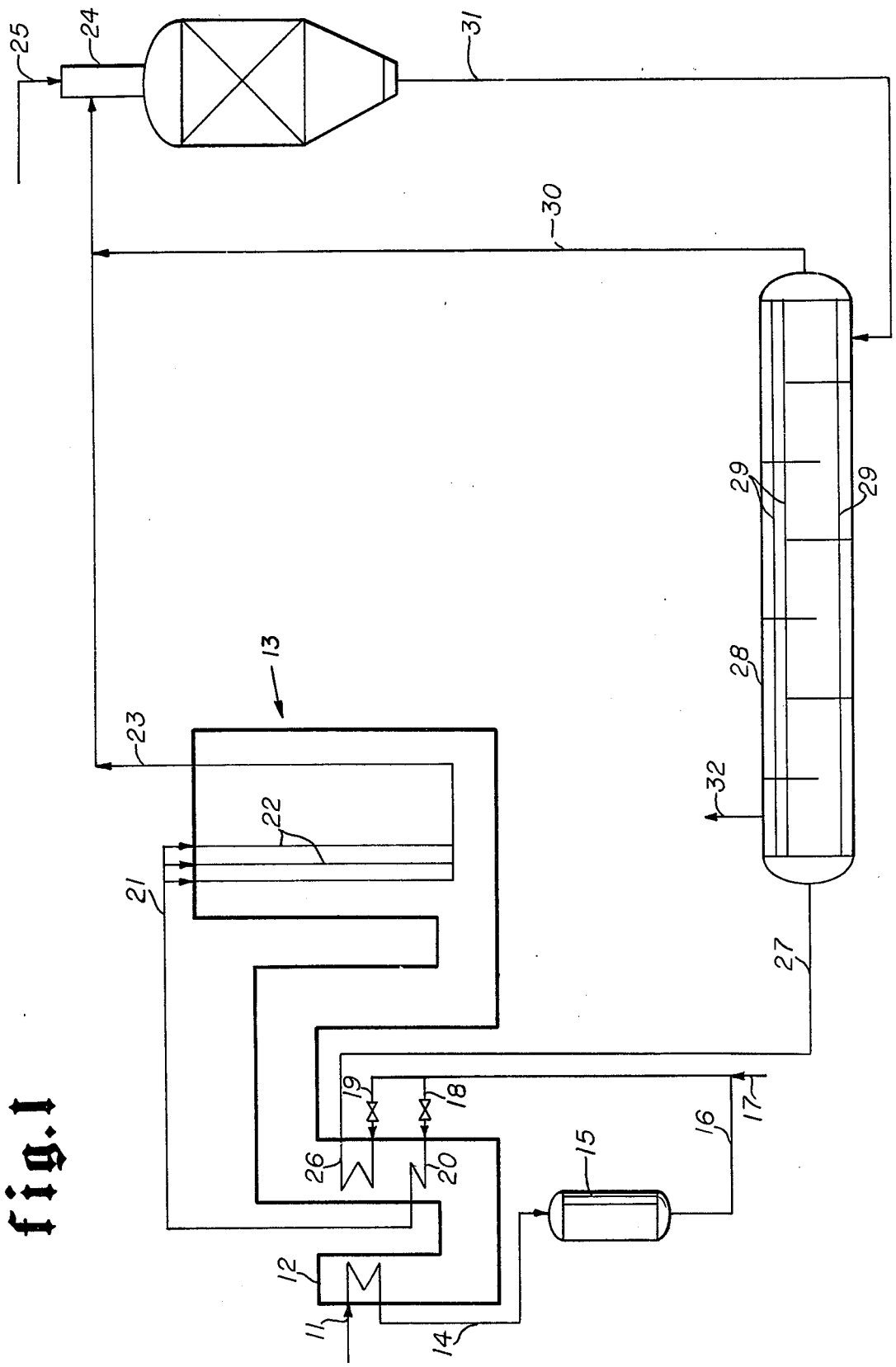
FIG. 1 is a flow diagram which illustrates one embodiment of the present invention.

The present invention is directed to an improved process for reforming hydrocarbons by the sequence of primary reforming followed by secondary reforming. More specifically, the present invention involves separating the hydrocarbon feed into parallel streams and, after preheating, heating a portion of the hydrocarbon feed to primary reforming conditions by radiant heating and heating another portion of the hydrocarbon feed to primary reforming conditions by indirect heat exchange with the effluent from the secondary reforming process. The present invention enables the design of a low energy synthesis process since a considerable amount of the heat necessary for the primary steam reforming is obtained from the process, and therefore, the overall fuel consumption can be reduced to obtain the desired primary reforming. Heretofore, the primary reforming process has been a large fuel consumption process where the heat introduced to the process stream by a conventional radiant steam reforming furnace has been recovered after the secondary reforming process in the form of steam by heating water which is at temperatures well below the temperatures used for primary reforming. The present invention has specific applicability to a low energy ammonia process where the requirement for the large amount of steam usually generated in a conventional process has been materially reduced, and thus an overall low energy ammonia process is achieved by reducing the fuel consumption in the primary reforming process while still generating the desired amount of steam.

The production of a hydrogen-rich gas or synthesis gas by steam reforming is known. The initial reaction which takes place is illustrated by the equation:

$$C_xH_y + H_2O \rightarrow xCO + (x + y/2)H_2$$

$$CH_4 + H_2O \rightarrow CO + 3H_2$$

This endothermic reaction is reversible and gives way to the exothermic methane forming reaction illustrated by the following:

$$CO + 3H_2 \rightarrow CH_4 + H_2O$$

Thus, the product gas of the primary steam reforming process is referred to as a partially reformed or hydrogen-rich gas since the complete conversion of hydrocarbons to hydrogen and carbon monoxide is not accomplished.

In the primary steam reforming process, hydrocarbons are contacted with steam in the presence of a steam reforming catalyst under conditions wherein the rate of production of a hydrogen-rich gas is favored. Gaseous hydrocarbons, or liquid hydrocarbons which can be gasified, are the feed material, such as natural gas, ethane, propane, LPG or naphthas boiling in the gasoline range and the like. The steam reforming catalysts which may be employed are nickel, nickel oxide, chromia, molybdenum, mixtures thereof, etc. The details of steam reforming catalysts are known, as well as the operating conditions, see for example U.S. Pat. No. 3,119,667, the specifics of which do not form a basis of the present invention. The steam reforming reaction is carried out at steam to carbon ratios of 2:1 to 6:1 and preferably 3:1 to 4.5:1 such that the outlet temperatures are maintained at between about 730° C. and 925° C., and preferably between about 790° C, and 870° C. The pressure in the steam reforming process may range from about atmospheric pressure to 75 atmospheres (1100 psi) and preferably between 20 and 60 atmospheres. In a specific embodiment of the present invention, the pressure is preferably between about 35 and 45 atmospheres.

The heating of the hydrocarbon feed to conditions at which the primary reforming occurs is usually carried out in a tube. Thus, specific temperatures to which the hydrocarbon feed is heated are governed by tube size and the metallurgy of the tube. In a specific embodiment of the invention, the tubes are filled with the steam reforming catalyst, conventionally a nickel oxide on an inert support which is reduced in situ with hydrogen, whereby the heating is through the tube wall and reaction occurs within the tube. However, according to the present invention, the heating of the hydrocarbon feed to conditions at which primary reforming occurs may be carried out prior to being in the presence of the steam reforming catalyst, usually in a multiplicity of heating and catalyst contacting steps, commonly referred to as adiabatic steam reforming (see U.S. Pat. No. 3,771,261), and such adiabatic reforming may occur in one parallel stream and not in another.

Unlike the prior art where a single piece of equipment, such as a steam reforming furnace or a special reformer, is suggested to carry out the primary steam reforming, the present invention uses a conventional reformer furnace and an exhanger-reactor such that the hydrocarbon feed can be divided and partially reformed as parallel streams. According to the present invention, about 15 to 60% volume of the hydrocarbon feed is passed to the exchanger-reactor while 85 to 40% by volume is fed to the conventional reformer furnace. In a preferred range, about 25 to 50% by volume of the hydrocarbon feed is fed to the exchanger-reactor. In a specific embodiment of the invention, the reformer furnace will contain not only a radiant heating section but also a convective heating section such that the heating of three parallel feeds can be accomplished. The third stream passed through the convective heating section may contain between 5 and 20% by volume of the hydrocarbon feed. The partially reformed gas obtained from each of the parallel streams may be combined for secondary reforming. The conditions in each of the parallel streams may be different, such as having different amount of steam or different outlet temperatures, and accordingly, some difference in reforming in each of the streams may occur. The composition of the partially reformed gas from each of the parallel streams may thus be different.

Following primary reforming, the combined partially reformed gas is further reacted to form additional hydrogen by secondary reforming. The partially reformed gas is reacted with oxygen, usually as air, and additional steam, if required, in the presence of a catalyst maintained at elevated temperatures and at approximately the pressure of the primary reforming process. The conditions in the secondary reformer are such that the temperatures are maintained at an outlet temperature between about 870° C. and 1075° C, preferably from about 910° to 1020° C. Air is preferably employed especially for ammonia production, to provide the oxygen requirement of the secondary reforming because of its low cost and availability, but it should be understood that oxygen or oxygen-enriched air can be used. Suitable secondary reforming catalysts are nickel, nickel oxide, cobalt oxide, chromia, molybdenum oxide, etc. The preferred catalyst is nickel. The conventional sequence of primary reformer followed by secondary reformer, and the details of the secondary reformer are described in more detail in U.S. Pat. No. 3,441,393.

The effluent from the seconday reformer is a stream containing large quantities of heat and according to the present invention is utilized to provide the heat to an exchanger-reactor. Since a substantial portion of the hydrocarbon feed can be passed through such an exhanger-reactor, the fuel normally consumed in a steam reforming process can be reduced substantially. A reduction of 25 to 100 NMBTU/HR of radiant reforming duty to reform 2600 mols/hr. of a natural gas hydrocarbon feed is made possible by using the parallel reformer system of the present invention.

The hydrogen and hydrogen-rich gases may be used in many important processes, e.g., mixtures of hydrogen and carbon monoxide are employed in the synthesis of hydrocarbons and of oxygenated hydrocarbons, such as alcohols or ketones. Many known petroleum refining processes such as hydrodesulphurization require hydrogen. A most important usage for the hydrogen-rich gas produced according to the present invention is in ammonia synthesis.

For a better understanding of the present invention, reference is made to the following examples and specific embodiments as shown in the drawings.

It will be understood that various valves, pumps, controls and related auxiliary equipment may be necessary in practicing the present invention. In the interest of simplicity, such items have not been shown or described since the need for them, their location and their manner of use are well known to those skilled in the art.

Referring to FIG. 1, a specific embodiment is illustrated which employs a conventional steam reforming furnace which is in parallel with an exchanger-reactor, wherein additional primary steam reforming is carried out according to the present invention. A hydrocarbon feed, which may be natural gas, ethane, propane, or naphtha is introduced in line 11 and preheated to about 370° to 430° C. preferably about 400° C. in preheater 12, which may be in the convection section of a primary reformer furnace 13. The gaseous hydrocarbon feed is then passed by line 14 to a pre-treater 15. The hydrocarbon feed may require pre-treatment to eliminate or decrease the concentration of undesirable components which may have a deleterious effect on subsequent processing steps. For example, many hydrocarbon feeds contain sulphur which is a steam reforming catalyst poison. In such a case, pre-treater 15 is a known desulphurizer such as a zinc oxide guard chamber. The effluent flows from the pre-treater 15 by line 16 and is mixed with steam introduced by line 17. The combined hydrocarbon feed and steam, is at about 350° C. and a pressure of 1 to 75 atmospheres.

In accordance with this embodiment of the present invention, the combined hydrocarbon feed and steam stream is divided into parallel streams and introduced in lines 18 and 19, respectively. Alternatively, the hydrocarbon feed may be divided into parallel streams with steam added to each stream. The steam to carbon ratio in each parallel stream may then be different. A portion of the hydrocarbon feed (40 to 85% by volume) and steam is introduced into line 18 wherein the mixture of hydrocarbon feed and steam is preheated in heat exchanger 20, which may be an exchanger within the convection section of the reformer furnace 13, and then the mixture is introduced by line 21 to a plurality of steam reforming tubes 22 in rows in the primary reformer furnace 13 heated by means for producing radiant heat such as down-fired burners between the rows of tubes 22 or side-fired burners. The steam reforming tubes 22 are filled with convectional steam reforming catalyst such as a commercial nickel catalyst. The effluent, a partially reformed gas, flows from tubes 22 by line 23 for introduction to the secondary reformer 24. Process air and steam are introduced by line 25 to secondary reformer 24 to carry out the secondary reforming. Another mixture of the hydrocarbon feed (15 to 60% by volume) and steam is introduced into line 19 wherein the mixture of hydrocarbon feed and steam is preheated in heat exchanger 26, and then introduced by line 27 to an exchanger-reactor 28. The exchanger-reactor 28 contains tubes 29 filled with steam reforming catalyst in one specific embodiment. The mixture of hydrocarbon feed and steam is passed through the plurality of tubes 29 and the effluent, a partially reformed gas, flows from the tubes 29 of exchanger-reactor 28 by line 30. The partially reformed gas in line 30, which may differ in composition, is combined with the partially reformed gas in line 23 from the primary reformer furnace and introduced into the secondary reformer 24.

According to the present invention, the effluent from the secondary reformer 24 is used to supply the heat of reaction for the mixture of hydrocarbon feed and steam by indirect heat exchange as the mixture is passed through the exchanger-reactor 28 to carry out primary reforming of the hydrocarbons in the mixture. In a specific embodiment, the exchanger-reactor 28 may be a tube and shell heat exchanger. The effluent or reformed gas from the secondary reformer 24 is passed by line 31 and introduced on the shell side of exchanger-reactor 28 to heat the hydrocarbons in the tubes 29. The reformer gas exits the exchanger-reactor 28 by line 32 whereby the hydrogen-rich gas may be used as such or further processed in a known manner. The tubes 29 may be partially filled or filled to substantially their entire length with stream reforming catalyst. On the other hand, the catalyst and stream being reformed may be on the shell side while the reformed gas may be passed through the tubes. Also the exchanger-reactor 28 may comprise a multiplicity of heating and catalyst contacting stages for adiabatic reforming. The pressure difference between the mixture of hydrocarbon feed and steam in tubes 29 and the reformed/gas on the shell side of exchanger-reactor 28 is small, thus allowing thin wall tubes to be used in the exchanger-reactor 28. However, the shell side of the exchanger-reactor 28 must be designed for the pressure at which the reforming process is being carried out. At the preferred process pressures, the exchanger-reactor 28 is a high pressure vessel.

Figure 2:
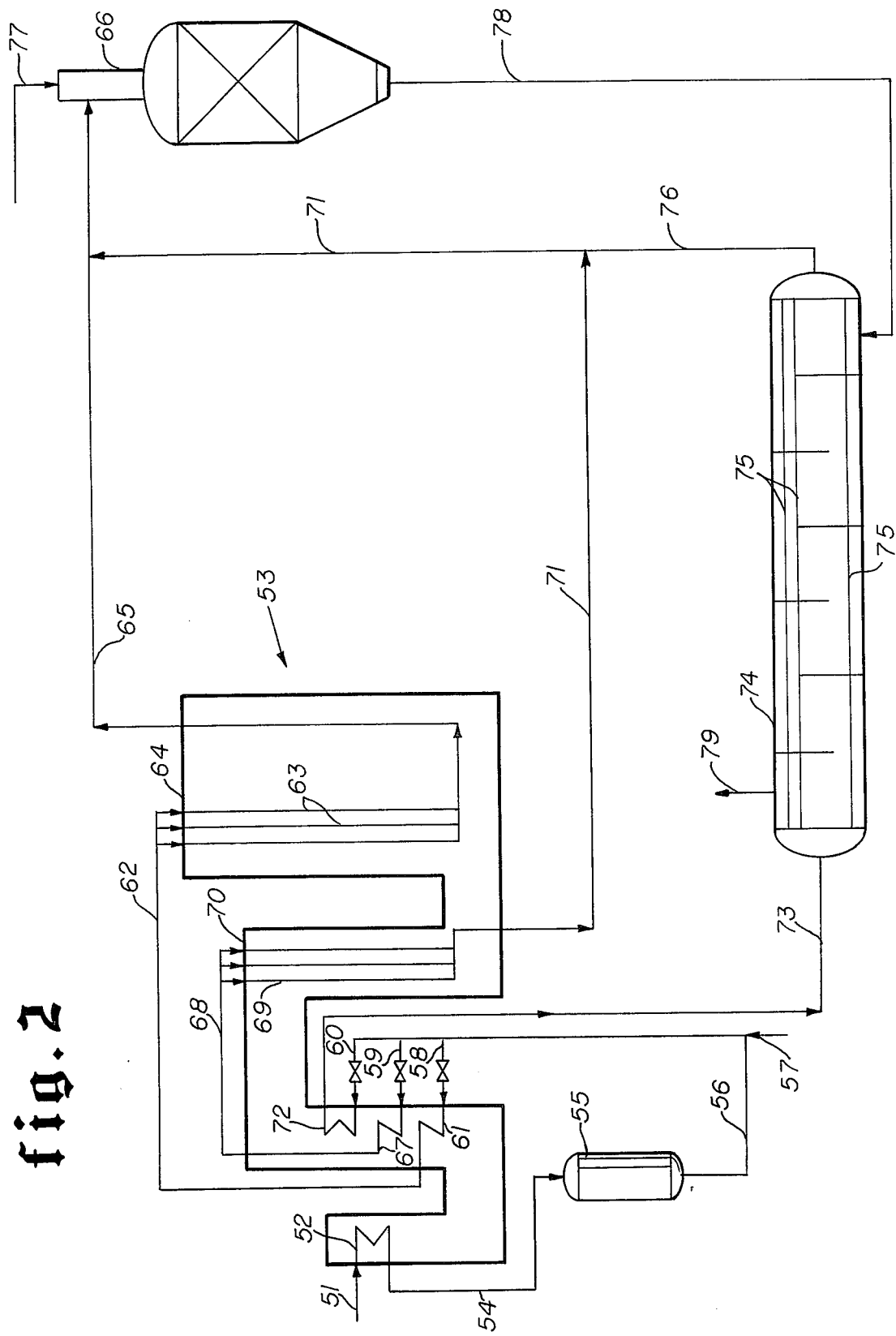
FIG. 2 is a specific embodiment of the present invention which includes a steam reforming furnace with both a radiant heat section and a convective heat section.

Referring to FIG. 2, a specific embodiment is illustrated which employs a steam reforming furnace wherein the steam reforming tubes are located in the convection section as well as the radiant section of the steam reforming furnace. A hydrocarbon feed is introduced in line 51 and preheated in preheater 52, which may be a heat exchanger in the convection section of the furnace 53. The gas is then passed by line 54 to a pre-treater 55. The effluent from the pre-treater 55 is removed by line 56 and is mixed with steam which is introduced by line 57.

In this specific embodiment the mixed stream of hydrocarbons and steam is introduced in parallel to lines 58, 59 and 60, respectively. The portion of hydrocarbon feed (35 to 80% by volume) and steam introduced in line 58 is preheated in heat exchanger 61 which may be in the convective heating section of the furnace 53, and then the mixture is introduced by line 62 into a plurality of tubes 63 in rows in the radiant section 64 of the furnace 53 having burners (not shown) for producing radiant heat. The tubes 63 are filled with commercial steam reforming catalyst. On the other hand, an adiabatic reformer may be used to heat the mixture with radiant heat. The effluent from the tubes 63 or partially reformed gas is passed by line 65 to the secondary reformer 66. In this embodiment a portion of the hydrocarbon feed (5 to 20% by volume) and steam is passed by line 59 to heat exchanger 67 where the mixture is preheated and then by line 68 to a plurality of tubes 69 which are in the convection section 70 of the steam reforming furnace 53. The mixture of hydrocarbon feed and steam in tubes 69 are at the steam reforming process pressure whereas the pressure outside tubes 69 is essentially ambient pressure. The tubes 69 are also filled with steam reforming catalyst. The effluent from the tubes 69 is passed by line 71 where it is combined with the other partially reformed gases and introduced to the secondary reformer 66. A third mixture of the hydrocarbon feed (15 to 60% by volume) and steam is passed by line 60 into heat exchanger 72 in the convection section of the furnace 53 where the mixture is preheated and then by line 73 into an exchanger-reactor 74. This mixture of hydrocarbon feed and steam is passed through the tubes 75 which may contain steam reforming catalyst wherein the hydrocarbons are partially reformed to hydrogen and carbon monoxide. The effluent from the tubes 75 is passed by line 76 where it is combined with the other partially reformed gases and introduced into the secondary reformer 66.

Also introduced into secondary reformer 66 by line 77 is a mixture of air and steam to carry out the secondary reforming reaction. The effluent from the secondary reformer 66, the reformed gas, is passed by line 78 into the shell side of exchanger-reactor 74 to provide the necessary heat for the reforming of the hydrocarbons and steam in the tubes 75. The reformed gas exits the exchanger-reactor 74 by line 79.

As a specific example, a hydrocarbon feed of natural gas, 2636.9 mol/hr(MPH), is introduced in line 51 and preheated to about 400° C. in preheater 52. The gas is then passed by line 54 through a zinc oxide guard chamber 55. After treatment, the gas is removed by line 56 where it is mixed with 10,004 MPH of steam introduced by line 57. The mixed stream of hydrocarbons and steam is divided into three separate portions for primary reforming. One portion of the mixed hydrocarbons and steam, 5942.5 MPH or about 47%, is introduced in line 58 where it is heated in heat exchanger 61 to about 500° C. and then passed through a plurality of tubes 63 in the radiant section of steam reforming furnace 53. The conditions of the partially reformed gas from the tubes 63 at the outlet of the furnace 53 is about 850° C. and a pressure of about 47 atmospheres. Another portion of the mixed hydrocarbons and steam, 1569.9 MPH or about 12%, is introduced in line 59 to heat exchanger 67 for preheating the mixture and then by line 68 to tubes 69 which are in the convection section 70 of the steam reforming furnace 53. The effluent or partially reformed gas from tubes 69, having an outlet temperature of about 850° C. and a pressure of about 47 atmospheres, is combined with the gas from tubes 63. A third portion of the mixed hydrocarbons and steam, 5128.5 MPH or about 41% is introduced in line 60 and passed to heat exchanger 72 for preheating the mixture. This mixture is then passed to exchanger reactor 74 where it is passed through tubes 75 which also contain a commerical nickel steam reforming catalyst. The effluent from tubes 75 has an outlet temperature of about 811° C. and a pressure of about 47 atmospheres. The combined effluents or partially reformed gas, 16,127.5 MPH is introduced to the secondary reformer 66 at a temperature of about 808° C. Also introduced to the secondary reformer 66, is a combined stream of air, 4122.9 MPH (wet), and steam 389.7 MPH, at a temperature of about 693° C. The effluent from the secondary reformer 66 has a temperature of about 979° C. which is passed by line 78 into the shell side of exchanger-reactor 74 to provide the necessary heat for the reforming of the hydrocarbons in tubes 75.

The parallel reforming of the present invention allows the adjustment in the steam production over the present day commercial primary reforming process. In the production of ammonia, an estimated savings of 2 to 6 MMBTU/ST of ammonia is possible by using the parallel reforming of the present invention. In other processes, the savings may be from twenty-five to over fifty percent of the primary reforming duty in BTU/HR.

The nature and objects of the present invention having been completely described and illustrated and the best mode thereof set forth, what we wish to claim as new and useful and secure by Letters Patent is:

1. In a process for the steam reforming of hydrocarbons which comprises the sequence of primary and secondary reforming, the improvement which comprises:
   in parallel
   a. heating a first mixture of hydrocarbon feed and steam to conditions at which primary reforming occurs by radiant heating and reforming said hydrocarbons in the presence of a steam reforming catalyst to form a first partially reformed effluent,
   b. heating a second mixture of hydrocarbon feed and steam to conditions at which primary reforming occurs by indirect heat exchange with process gas as hereinafter defined and reforming said hydrocarbons in the presence of a steam reforming catalyst to form a second partially reformed effluent,
   introducing said first and second partially reformed effluents to a secondary reformer to carry out said secondary reforming in the presence of oxygen and forming a secondary reforming effluent, and
   passing said secondary reforming effluent as the process gas in indirect heat exchange with said second mixture of hydrocarbon feed and steam as set forth in (b) above.

2. A process according to claim 1 wherein said hydrocarbons are heated and reformed in tubes containing said steam reforming catalyst.

3. A process according to claim 1 wherein at least one mixture of hydrocarbon feed and steam is first heated and then is reformed adiabatically in the presence of a steam reforming catalyst.

4. A process according to claim 1 wherein 15 to 60% by volume of said hydrocarbon feed is heated by indirect heat exchange with the effluent from said secondary reforming.

5. A process according to claim 1 wherein 25 to 50% by volume of said hydrocarbon feed is heated by indirect heat exchange with the effluent from said secondary reforming.

6. A process according to claim 1 wherein said reforming process pressure is about 20 to 60 atmospheres.

7. In a process for the steam reforming of hydrocarbons which comprises the sequence of primary and secondary reforming, the improvement which comprises:
   in parallel
   a. heating a first mixture of hydrocarbon feed and steam to conditions at which primary reforming occurs by radiant heating and reforming said hydrocarbons in the presence of a steam reforming catalyst to form a first partially reformed effluent,
   b. heating a second mixture of hydrocarbon feed and steam to conditions at which primary reforming occurs by convective heating at essentially ambient pressure and reforming said hydrocarbons in the presence of a steam reforming catalyst to form a second partially reformed effluent,
   c. heating a third mixture of hydrocarbon feed and steam to conditions at which primary reforming occurs by indirect heat exchange with process gas as hereinafter defined and reforming said hydrocarbons in the presence of a steam reforming catalyst to form a third partially reformed effluent,
   combining said first, second and third partially reformed effluents and introducing said effluents to a secondary reformer to carry out said secondary reforming in the presence of oxygen and forming a secondary reforming effluent, and
   passing said secondary reforming effluent as a process gas in indirect heat exchange with said third mixture of hydrocarbon feed and steam as set forth in (c) above.

8. A process according to claim 7 wherein said hydrocarbons are heated and reformed in tubes containing said steam reforming catalyst.

9. A process according to claim 7 wherein at least one portion of said hydrocarbon feed is first heated and then is reformed adiabatically in the presence of a steam reforming catalyst.

10. A process according to claim 7 wherein 5 to 20% by volume of said hydrocarbon feed is heated by convective heating at essentially ambient pressure.

* * * * *